May 19, 1959 L. G. POLIMEROU 2,887,587

FUNCTION GENERATOR EMPLOYING PHOTO-TUBES

Filed Jan. 18, 1955 2 Sheets-Sheet 1

INVENTOR

Lazarus G. Polimerou

BY Edwin E. Greigg

ATTORNEY

FUNCTION GENERATOR EMPLOYING PHOTO-TUBES

Filed Jan. 18, 1955 2 Sheets-Sheet 2

INVENTOR

Lazarus G. Polimerou

BY Edwin E. Greigg

ATTORNEY

United States Patent Office 2,887,587

Patented May 19, 1959

2,887,587

FUNCTION GENERATOR EMPLOYING PHOTO-TUBES

Lazarus G. Polimerou, Glens Falls, N.Y.

Application January 18, 1955, Serial No. 482,620

7 Claims. (Cl. 250—217)

This invention relates to a method and means for function generation and particularly to a method and means for producing at high speed an extremely precise electrical replica of any specified waveform, or generally to a method and means for producing a function of a function when the input voltage is other than linear with respect to time.

Heretofore, beam type function generators have been developed which employ a dependent function mask placed in close juxtaposition to the plane of the phosphor; or the plane of the phosphor is projected by a suitable optical system into the plane of the mask. Limitations of these previously developed function generators are: (1) the finite spot size results in some distortion of which compensation is difficult; since distortion depends on the gain of the amplifier, the intensity of the spot, the height of the pattern, and the location of the quiescent position, all of which vary from time to time, (2) halo effect of the screen which may cause clipping of high peaks of the template, (3) parallax, and (4) drift. Careful proportioning of overall height and width of the pattern, location of the quiescent position, and adjustment of gain minimize these difficulties, but definite limitations of accuracy exist.

Another type of function generator which has been developed in the past is one that approximates the function by a series of small segments. A limitation in this type of function generator is that a relatively large number of segments are required to obtain the accuracy of the cathode ray tube type, which has in essence an infinite number of segments. Furthermore, the large number of components required in this segment type function generator becomes cost-prohibitive as the number of segments are increased to obtain the desired accuracy. Also, a permanent record of the function, upon which the unit operates, is not kept as in the cathode ray tube type, in which the dependent function is permanently kept on glass, for instance, which can be filed.

An object of the present invention is the novel arrangement of a function generating system which overcomes the disadvantage of drift and of errors involved in measuring the height of the pattern.

Another object of this invention is the provision of a system of function generation which is compatible with methods now in existence for producing multiplication such that by employing amplitude modulation upon the square waves produced herein, a combination of a function generator-mulitiplier can be produced, whereby a function of a function multiplied simultaneously by another function is obtainable.

According to another feature of this invention is the provision of a novel combination of a cathode ray tube with a masking means and suitable pulse detecting means permitting great flexibility in the production of an electrical replica of a predetermined waveform.

These objects and features, as well as still others, will be explained in detail in the following description, given with reference to the accompanying drawings, in which.

The present invention utilizes an electron beam of a cathode ray tube which is made to scan a mask at a relatively high sweep rate. As the beam passes the "reference" line of the mask, a pulse is produced by a suitable detecting means, such as a photo-multiplier tube, which looks only at this "reference" line. As the beam continues its movement, it scans past the "function" line of the mask, whereupon a second pulse is produced by a second suitable detecting means which is looking only at the "function" line. The time delay or interval between these two pulses is directly proportional to the length of the ordinate between the reference line and the function line, assuming of course a linear sweep. These two pulses are then shaped and fed into grids of a flip-flop circuit (Binary Scalar 102) which produces a square wave that has a constant amplitude and a width proportional to the time delay or interval between the pulses. In other words, more specifically, the first pulse initiates the square wave and the second pulse terminates the square wave. Thus a train of square waves is produced. The square waves have a fundamental frequency which, in the present embodiment of the invention, is approximately 2000 cycles per second. The square waves are then rectified and integrated, thus producing a varying D.-C. voltage that is proportional to the ordinate between the reference line and the function line; that is, a voltage proportional to the value of the function at the point being scanned.

As the ordinate length varies, so does the output voltage. By moving the scanning line (in a direction perpendicular to the scan) over the mask, the ordinate lengths can be made to vary with respect to the position of the scan. The direction perpendicular to the scan is called the independent function axis, and the direction of the scan represents the dependent function axis. If the scanning line is moved in a linear fashion with respect to time along the independent axis, a voltage is produced in the output which is the electrical replica of the mask. Furthermore, the scanning line can be moved in a nonlinear manner along the independent function axis thus producing a function of a function.

Figure 1:
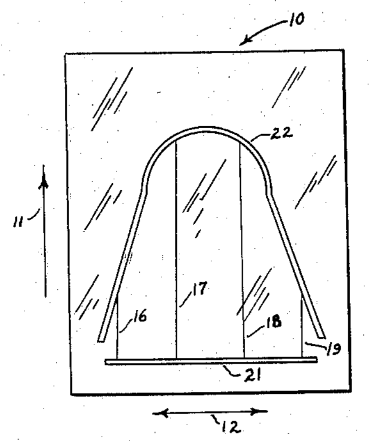
Fig. 1 is a representation of one form of mask of which an electrical replica is to be produced.

Referring now to the drawings, and more particularly to Fig. 1 of the drawings, 10 is an opaque slide produced on any suitable material such as glass, plastic, or the like. The direction of scanning of the mask is in a direction represented by an arrow 11, and the independent voltages are represented at various points along an axis 12 which is perpendicular to the direction of scanning. Several ordinates, for example, may be such as those designated at 16, 17, 18 and 19. A "reference" line or marking 21 is a transparent line or mark on the otherwise opaque slide, and a dependent "function" line or marking 22 is also transparent to light produced by an electron beam impinging on a phosphor screen of a cathode ray tube.

The dependent function desired, with its reference line, is first drawn on paper to a predetermined scale. A photograph may then be made and prepared for a standard glass slide which, of course, is then entirely opaque except for the reference and function lines which are transparent.

Figure 2:
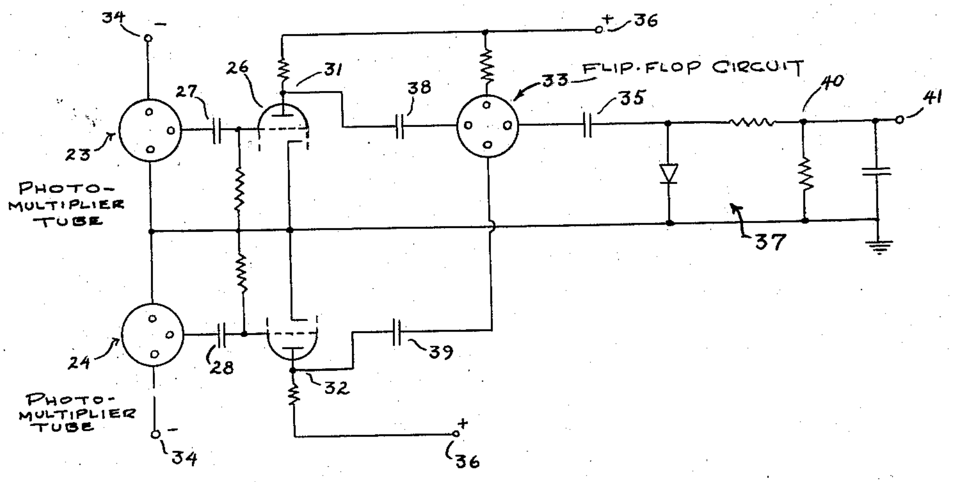
Fig. 2 is a diagrammatic representation of the function-forming device.

Referring now to Fig. 2 of the drawings, 23 and 24 represent suitable detecting means such as for example the 931A photo-multiplier tubes which may be operated by a −1000 volt supply 34. Any common sweep and synchronizing circuit may be used. A tube 26 consisting essentially of two halves may be of the 12AT7 type or its equivalent. The voltage to operate tube 26 is provided from an external source 36. Capacitors 27 and 28 serve to couple the output of the photo-multiplier tubes 23 and 24 to the grids of the tube 26. The pulse output at each half of the tube 26 at 31 and 32 are fed separately through condensers 38 and 39, respectively, into grids of a flip-flop circuit 33 (Binary Scalar). The output of the flip-flop circuit 33 is passed through a D.C. isolating capacitor 35 to a rectifier 37 and integrating circuit 40 to produce an output at 41 which is a D.C. voltage proportional to the value of the function scanned at that point on the mask.

In operation, assume the beam is scanning at this instant along the ordinate 17, in Fig. 1. As the beam passes the reference line 21, a pulse is produced by the photo-multiplier tube 24, assuming this is the tube looking only at the reference line. As the beam continues its scan along the ordinate 17, it passes the function line 22 at which time a pulse is produced by the photo-multiplier tube 23. The time delay or interval between these two pulses is therefore directly proportional to the length of the ordinate 17 between the reference line 21 and the function line 22. Each pulse, the one produced by the photo-multiplier tube 24 and the one produced by the photo-multiplier tube 23, is coupled into the grid of a respective half of the tube 26. The tube 26 is used to clip the large voltage pulse from the photo-multiplier tube, producing an amplified clipped pulse that is free from variations of light intensities. Each respective pulse is then sharpened and suitably shaped by passing through a suitable small-valued capacitor as at 38 and 39, and then fed, still separately, into a flip-flop circuit 33. The value of these sharpened pulse-voltages is just at the minimum level for tripping the flip-flop circuit which produces a square wave of constant amplitude that has a width proportional to the time delay or interval between the original pulses. The square waves are then fed through the D.-C. isolating capacitor 35 to the rectifier 37 which establishes a voltage reference for the signal. An integrating circuit 40 is then used to produce a voltage proportional to the varying widths of the square wave. The voltage produced for this single scan 17 is proportional to the length of line 17 between the reference line 21 and the function line 22, i.e., a voltage proportional to the value of the function at that point.

Figure 3:
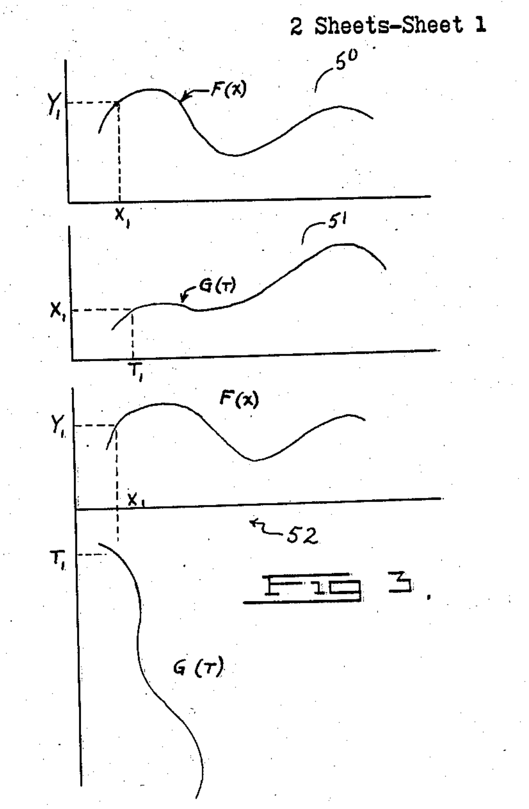
Fig. 3 is a graphic representation of what the function generator does.

Fig. 3 is a graphic representation of what the function generator does. At a particular time value there is a corresponding value of the X-variable for which, in turn, there is a corresponding value of a Y-variable. Thus, $$Y=F(X)$$

when $$X=G(t)$$

The function generator automatically produces a voltage Y for a voltage X at the time $t$.

In Fig. 3, 50 is a dependent function drawn on a mask. 51 is an independent voltage which is applied to vertical plates, and 52 is a graphic representation of the method used by the function generator to produce voltage Y, for a given voltage X, at a time $t$.

In the present embodiment of the function generator, consideration of the type of phosphor screen of the cathode ray tube led to the use of the 5LP5 tube although some other available type may be used to better advantage without departing from the spirit of this invention. This tube, however, displays a very short persistence characteristic in the blue-violet portion of the spectrum. The 931A photo-multiplier tube was used because of its high gain as well as for its sensitivity to the same blue-violet portion of the spectrum. No optical system was used in this embodiment.

Figures 4, 5, 6:
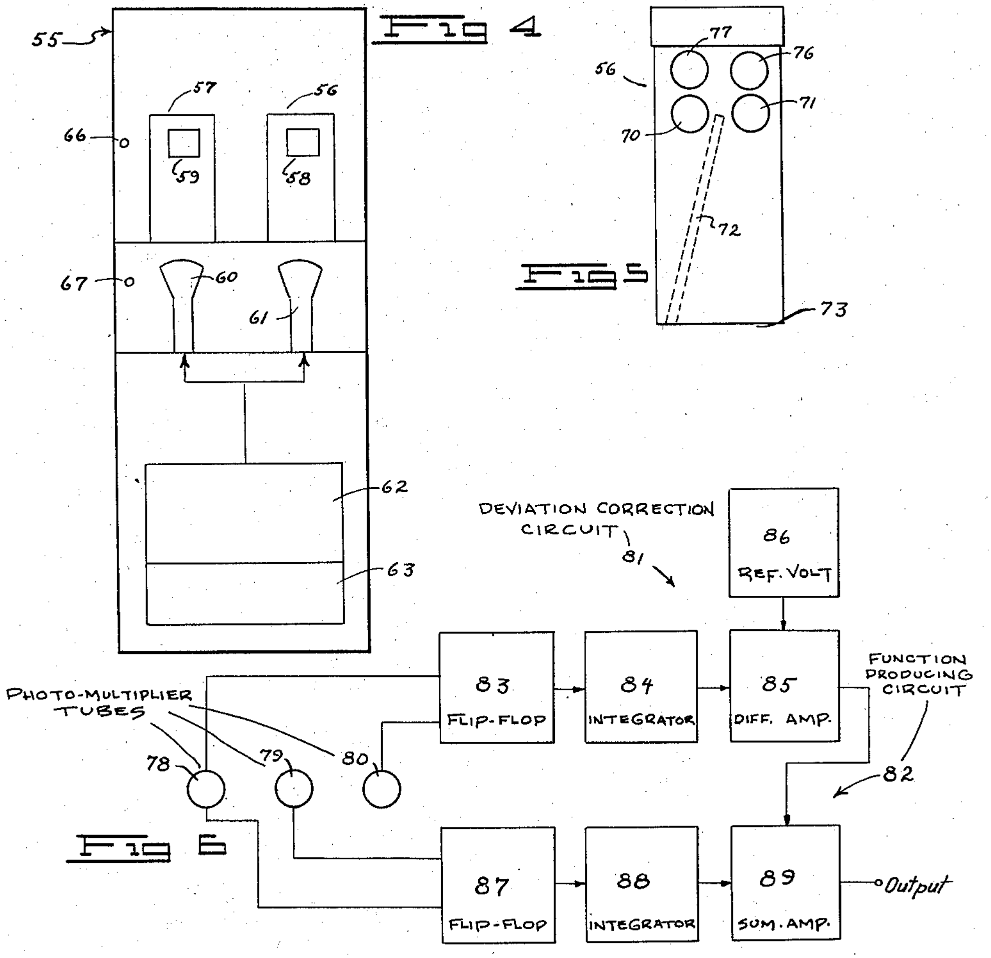
Fig. 4 is a front view of one form of mechanical mounting showing two of the four function generators.
Fig. 5 is a front view of one of the phototube enclosures which contains the pulse detecting means of the function generator.
Fig. 6 is a block diagram of one modification of the present invention which can be used to correct for errors due to change in gain in the system.

Fig. 4 represents one possible arrangement for the mechanical system, or the component parts, of the function generator although the system is capable of other arrangements. Within a rack, or housing 55 may be arranged several individual function generators. In this Fig. 4, two complete systems are shown, but others may also be located within a single housing or upon the same rack. 56 and 57 represent the enclosure housings for the detectors, or phototube multipliers. The electronic circuit mounts may be located conveniently on one side of the phototube housings as shown at 58 and 59. Cathode ray tubes 60 and 61 are located such that their respective screens are in close proximity to the phototube enclosure housings for reasons which will be explained presently. In the lower compartment of the rack or housing may be located the sweep and sync circuit 62 and the high voltage power supply 63. As sweep and synchronizing circuits per se are well known in the art, a detailed description of them here is deemed unnecessary. However, their use here may be described as merely to produce a precise sawtooth wave to be applied to the horizontal plates of the cathode ray tubes 60 and 61 in a manner also well known in the art. The output of the function generator may be brought to be conveniently located as at 66. The input to the vertical plates may also be conveniently located as at 67. The ends of the individual housings may be removable for visual inspection of the initial positioning of the scan. (The high voltage should be shut off for this operation.)

Referring now to Fig. 5, this enclosure housing here is taken to be 56 although it could as readily be the enclosure housing 57, Fig. 4. In the present embodiment of the function generator there are two photo-multiplier tubes 70 and 71 separated by a partition 72 such that, for example, phototube 70 may view only the reference line and phototube 71 may view only the function line on the mask without light interference from each other. The mask is located just beneath this housing between this housing and the face of the cathode ray tube as at 73. The function generator circuit may be located in close relationship to the photo-multiplier tubes as indicated by the binary scalar 76 and the amplifier 77.

In Fig. 6 there is disclosed one possible modification of the present invention. In this modification three photo-multiplier tubes are used, here shown as 78, 79 and 80. 81 is a deviation correcting circuit which is made up of a flip-flop circuit 83, an integrator 84, a differential amplifier 85, and a reference voltage source 86. The function producing circuit 82 is made up of a flip-flop circuit 87, an integrator 88, and a summing amplifier 89. A second reference line is added to the mask and will be utilized to correct for errors due to changes in gain in the system which affect the second reference line and the function line equally. By the addition of a third photo-multiplier tube, a second parallel system can be formed which utilizes trigger pulses from the first and second reference lines to start and stop, respectively, a flip-flop circuit, which produces square waves whose widths are proportional to the time delay or interval between the trigger pulses. Since the distance between the two reference lines is everywhere constant, the D.-C. voltage produced as the result of integrating the train of square waves is constant. By comparing this voltage to some reference power supply voltage in a differential amplifier, any deviation of the first voltage from the reference voltage, will produce an error voltage which is proportional to the deviation. This error voltage can then be utilized to correct for errors in the other parallel circuit which produces the actual function.

Of course external scale-factor adjustment circuits may be used with the present function generator if desired.

Other modifications may consist of employing amplitude modulation at the output of the flip-flop circuit to obtain a function of a function multiplied simultaneously by another function. Furthermore, a difficult or complex function may be broken into sections of curves and each section placed on a function generator unit with a switch arrangement such that the whole curve can be reproduced, as described in my article printed in the IRE Transactions on Electronic Computers, volume EC–6, No. 3, September 1957.

It will be understood that the embodiment herein described is merely illustrative of the invention and one application thereof and that modifications can be made and it is capable of other applications all within the scope and spirit of this invention.

What I claim is:

1. In a function generator, the combination comprising, a cathode ray tube to produce an electron beam, a sweep and synchronizing means arranged to sweep and scan said beam repeatedly across a face of said tube, said tube having a phosphor coated face emitting light when struck by an electron beam, an opaque mask, a first mark on said mask, a second mark on said mask which varies in distance from said first mark in accordance with a preselected function, a first detecting means arranged to produce an electrical pulse as said electron beam passes said first mark, and a second detecting means arranged to produce an electrical pulse as said electron beam passes said second mark, a first and second means each coupled to the respective first and second detecting means to clip the pulses developed by the respective first and second detecting means and also including means to shape the clipped pulses into narrow pulses, and a circuit means into which is fed the pulses from each of said detecting means to produce an electrical pulse which varies in accordance with the time interval between the pulses.

2. In a function generator, the combination comprising, a cathode ray tube, a mask means of opaque material arranged in close relation to a face of said cathode ray tube, a first transparent mark in a predetermined position on said mask to allow light produced by the cathode ray to pass through said mask at said first mark, a second transparent mark on said mask which varies in accordance with a preselected function to allow light produced by the cathode ray to pass through said mask at said second mark, a first detecting means to detect light passing through said first mark and to produce a pulse responsive thereto, a second detecting means to detect light passing through said second mark and to produce a pulse responsive thereto, a first and second means each coupled to the respective first and second detecting means to clip the pulses developed by the respective first and second detecting means and also including means to shape the clipped pulses into narrow pulses, and a flip-flop circuit means into which is fed pulses from each of said clipping means to produce voltage waves the widths of which vary in accordance with the time interval between the pulses.

3. In a function generator the combination comprising a cathode ray tube to produce a cathode ray, a mask, means to cause said cathode ray to sweep and produce light to scan said mask, a first line on said mask to serve as a reference line, a second line on said mask which varies in distance from said first line in accordance with a predetermined function, a first phototube to produce a voltage pulse as said light scans past said first line, a second phototube to produce a voltage pulse as said light scans past said second line, a first and second means each coupled to the respective first and second phototube for clipping the voltage pulses produced by the respective first and second phototube and also including means to shape the respective clipped pulses into narrow pulses, and a circuit means into which is fed said first clipped and shaped pulse and said second clipped and shaped pulse to produce a voltage wave form the width of which varies in accordance with the time interval between the two pulses.

4. In a function generator the combination comprising a cathode ray tube to produce an electron beam, a mask, a first line on said mask to serve as a first reference line, a second line on said mask parallel to said first line to serve as a second reference line, a third line on said mask which varies in distance from said first line in accordance with a predetermined function, circuit means to cause said electron beam to sweep and scan said mask, a first detecting means to produce a first electrical pulse as light produced by said electron beam passes said first line, a second detecting means to produce a second electrical pulse as light produced by said electron beam passes said third line, a third detecting means to produce a third electrical pulse as light produced by said electron beam passes said second line, an integrating circuit to produce a constant voltage in accordance with the time delay between said first and second pulses, a source of reference voltage to which is compared said constant voltage, a flip-flop circuit to produce an electrical wave which varies in accordance with the time delay between said first and third pulses, which when integrated produces a varying D.-C. voltage according to the variance of the mask.

5. A function generator, the combination comprising, a cathode ray tube to produce an electron beam, a sweep and synchronizing means arranged to scan the electron beam in one direction repeatedly across a face of the tube at a position specified by an arbitrary input voltage to the tube, the tube also having a phosphor coated face for emitting light when struck by the electron beam, an opaque mask, a first transparent mark on the mask establishing a point of reference, a second transparent mark on the mask whose ordinate on the mask varies in accordance with a preselected function, at least two detecting means so arranged to produce an electrical pulse as the electron beam passes the first transparent mark and to produce an electrical pulse as the electron beam passes the second transparent mark, and a circuit means into which are fed the electrical pulses of the detecting means to produce square waves having a constant height but varying widths according to the position of the scan relative to the ordinates of the pre-selected function.

6. A function generator, the combination comprising, a cathode ray tube to produce an electron beam, a sweep and synchronizing means arranged to scan the beam in one direction repeatedly across a face of the tube, the scan establishing a line of scan which is positioned by an arbitrary input voltage over the face of said tube, said tube having a phosphor coated on the face of the tube for emitting light when struck by the electron beam, an opaque mask having a first transparent mark on said mask and a second transparent mark whose ordinate on the mask varies in accordance with a pre-selected function, at least two detecting means so arranged to produce an electrical pulse as the electron beam passes the first transparent mark and to produce an electrical pulse as said electron beam passes said second transparent mark, a circuit means into which are fed the said electrical pulses from the detecting means to produce square waves having a constant height but varying widths according to the position of the line of scan relative to the ordinate of the pre-selected function, and an electrical circuit which rectifies and then averages the square waves to produce a D.-C. varying output voltage in accordance with the ordinates of the varying instantaneous value of the pre-selected function being scanned by the beam as it is positioned on the face of the tube by the arbitarary input voltage in establishing the line of scan at the ordinates.

7. A function generator, the combination comprising, a cathode ray tube to produce an electron beam, a sweep and synchronizing means arranged to scan the beam in one direction repeatedly across a face of the tube, the scan establishing a line of scan which is positioned by an arbitrary input voltage over the face of said tube, said tube having a phosphor coated on the face of the tube for emitting light when struck by the electron beam, an opaque mask having a first transparent mark on said mask and a second transparent mark whose ordinate on the mask varies in accordance with a pre-selected function, detecting means so arranged to produce an electrical pulse as the electron beam passes the first transparent mark and to produce an electrical pulse as said electron beam passes said second transparent mark, a circuit means into which are fed the said electrical pulses from the detecting means to produce square waves having a constant height but varying widths according to the position of the line of scan relative to the ordinate of the pre-selected function; and an electrical circuit which rectifies and then averages the square waves to produce a D.-C. varying output voltage in accordance with the ordinates of the varying instantaneous value of the pre-selected function being scanned by the beam as it is positioned on the face of the tube by the arbitrary input voltage in establishing the line of scan at the ordinates.

References Cited in the file of this patent

UNITED STATES PATENTS

| | | |
|---|---|---|
| 2,641,753 | Oliwa | June 9, 1953 |
| 2,705,901 | Sherwin | Apr. 12, 1955 |

OTHER REFERENCES

Electronics (Pederson et al.), May 1952, pages 140–144.